US011863057B2

(12) United States Patent
Young (10) Patent No.: US 11,863,057 B2
(45) Date of Patent: Jan. 2, 2024

(54) HIGH BANDWIDTH CONSTANT ON-TIME PWM CONTROL

(71) Applicant: Alpha and Omega Semiconductor International LP, Toronto (CA)

(72) Inventor: Chris M. Young, Round Rock, TX (US)

(73) Assignee: Alpha and Omega Semiconductor International LP, Toronto (CA)

( * ) Notice: Subject to any disclaimer, the term of this patent is extended or adjusted under 35 U.S.C. 154(b) by 0 days.

(21) Appl. No.: 18/163,016

(22) Filed: Feb. 1, 2023

(65) Prior Publication Data

US 2023/0253870 A1 Aug. 10, 2023

Related U.S. Application Data

(63) Continuation of application No. 17/171,931, filed on Feb. 9, 2021, now Pat. No. 11,606,018.

(51) Int. Cl.
*H02M 3/157* (2006.01)
*H02M 1/00* (2006.01)
(Continued)

(52) U.S. Cl.
CPC ....... *H02M 1/0025* (2021.05); *H02M 1/0032* (2021.05); *H02M 3/157* (2013.01);
(Continued)

(58) Field of Classification Search
CPC ............. H02M 3/1566; H02M 1/0003; H02M 1/0025; H02M 1/0032
See application file for complete search history.

(56) References Cited

U.S. PATENT DOCUMENTS 7,622,820 B1  11/2009  Prodic et al.
8,963,519 B2  2/2015  Zambetti et al.
(Continued)

OTHER PUBLICATIONS

Stmicroelectronics NV, Digital multi-phase constant-on-time regulator based on voltage controlled oscillator, Mar. 28, 2017, accessed Dec. 8, 2020, https://www.st.com/content/ccc/resource/technical/document/technical_note/group0/e0/e0/0e/7b/5f/d0/4e/8b/DM00379978/files/DM00379978.pdf/jcr:content/translations/en.DM00379978.pdf.

*Primary Examiner* — Alex Torres-Rivera
(74) *Attorney, Agent, or Firm* — Craige Thompson; Thompson Patent Law; Timothy D. Snowden (57) ABSTRACT

Apparatus and associated methods relate to dynamic bandwidth control of a variable frequency modulation circuit by selective contribution of a crossover frequency tuning engine (XFTE) in response to a transient in a switching frequency. In an illustrative example, the XFTE may generate a transient control signal ($C_{trans}$) in response to a transient in a control output signal ($C_{out}$) indicative of switching frequency and received from a feedback control circuit. The XFTE may generate $C_{trans}$, for example, according to a predetermined relationship between a crossover frequency and the switching frequency of the modulation circuit. The feedback control circuit may, for example, generate $C_{out}$ from a predetermined reference and a control input signal. $C_{out}$ may, for example, correspond to a pulse-width modulated output delivered to a load through an inductor. Various embodiments may advantageously increase the effective bandwidth of the modulation circuit while maintaining desired frequency response characteristics.

30 Claims, 9 Drawing Sheets

(51) Int. Cl.
H02M 3/156 (2006.01)
H02M 3/158 (2006.01)

(52) U.S. Cl.
CPC ........ H02M 3/1566 (2021.05); *H02M 1/0012* (2021.05); *H02M 3/1586* (2021.05)

(56) References Cited

U.S. PATENT DOCUMENTS

| | | |
|---|---|---|
| 8,981,743 B2 | 3/2015 | Zambetti et al. |
| 10,523,102 B1 | 12/2019 | Babazadeh et al. |
| 2006/0152204 A1* | 7/2006 | Maksimovic ....... H02M 3/1588 323/284 |
| 2009/0309567 A1 | 12/2009 | Morroni et al. |
| 2010/0237838 A1* | 9/2010 | Templeton .......... H02M 3/1588 323/271 |
| 2014/0217999 A1* | 8/2014 | Wibben ................ G05F 1/468 323/282 |
| 2017/0126119 A1 | 5/2017 | Bernardon |
| 2019/0199204 A1* | 6/2019 | Bhandarkar ........ H02M 1/4225 |
| 2019/0319610 A1 | 10/2019 | Yu et al. |
| 2020/0127566 A1* | 4/2020 | Lazaro ................ H02M 1/0061 |

* cited by examiner

HIGH BANDWIDTH CONSTANT ON-TIME PWM CONTROL

CROSS-REFERENCE TO RELATED APPLICATIONS

This application is a continuation and claims the benefit of U.S. application Ser. No. 17/171,931, titled "High Bandwidth Constant On-Time PWM Control," filed by Chris M. Young, on Feb. 9, 2021.

This application incorporates the entire contents of the foregoing application(s) herein by reference.

TECHNICAL FIELD

Various embodiments relate generally to variable frequency modulation.

BACKGROUND

Electronic devices receive power in a variety of ways. For example, consumer electronic devices may receive power from a wall outlet (e.g., mains) or from various portable sources (e.g., batteries, renewable energy sources, generators). Battery operated devices have an operational time that is dependent upon battery capacity and average current draw. Manufacturers of battery powered devices may strive to reduce the average battery current of their products to offer longer device use between battery replacement or between charge operations. In some examples, manufacturers of mains-powered devices may strive to increase power efficiency of their products to minimize thermal loads and/or to maximize the performance per watt of power consumed.

In some electronic devices, an input voltage supply (e.g., battery input, rectified mains supply, intermediate DC supply) may be converted to a different voltage by various voltage conversion circuits. Switch-mode power supplies have gained popularity as voltage conversion circuits due to their high efficiency and therefore are often used in various electronic devices.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provides the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to dynamic bandwidth control of a variable frequency modulation circuit by selective contribution of a crossover frequency tuning engine (XFTE) in response to a transient in a switching frequency. In an illustrative example, the XFTE may generate a transient control signal ($C_{trans}$) in response to a transient in a control output signal ($C_{out}$) indicative of switching frequency and received from a feedback control circuit. The XFTE may generate $C_{trans}$, for example, according to a predetermined relationship between a crossover frequency and the switching frequency of the modulation circuit. The feedback control circuit may, for example, generate $C_{out}$ from a predetermined reference and a control input signal. $C_{out}$ may, for example, correspond to a pulse-width modulated output delivered to a load through an inductor. Various embodiments may advantageously increase the effective bandwidth of the modulation circuit while maintaining desired frequency response characteristics.

Various embodiments may achieve one or more advantages. For example, some embodiments may advantageously maintain a predetermined relationship between the switching frequency and the crossover frequency during a transient such as, for example, in a load, a power source, or some combination thereof. Various embodiments may, for example, maintain a predetermined relationship including a range of relationship values such that a circuit advantageously maintains an approximate switching frequency to crossover frequency ratio. Various embodiments may advantageously provide more consistent power to a load. In various embodiments, a bandwidth of a regulated power supply circuit may be advantageously increased by maintaining the predetermined relationship between the crossover frequency and switching frequency and, thereby, maintaining desired stability, noise, and/or transient response characteristics of the circuit even during transients in the switching frequency. Various embodiments may advantageously increase the effective bandwidth of a variable frequency modulation circuit across a wider range of switching frequencies.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a high bandwidth variable frequency modulation system is introduced with reference to FIG. 1 that operates to maintain a predetermined relationship between a crossover frequency and switching frequency. Second, that introduction leads into a description with reference to FIGS. 2A-3B of exemplary high bandwidth variable frequency modulation circuits, including exemplary crossover frequency tuning engines. FIG. 4 depicts an exemplary digital embodiment of a crossover frequency tuning engine. Third, with reference to FIG. 5, exemplary results of operation of a crossover frequency tuning engine are described in application to an exemplary variable frequency modulation circuit. Fourth, with reference to FIGS. 6-7, the discussion turns to exemplary methods of maintaining and setting, respectively, a predetermined crossover frequency to switching frequency relationship. Finally, the document discusses further embodiments, exemplary applications and aspects relating to high bandwidth variable frequency modulation circuits employing crossover frequency tuning.

Figure 1:
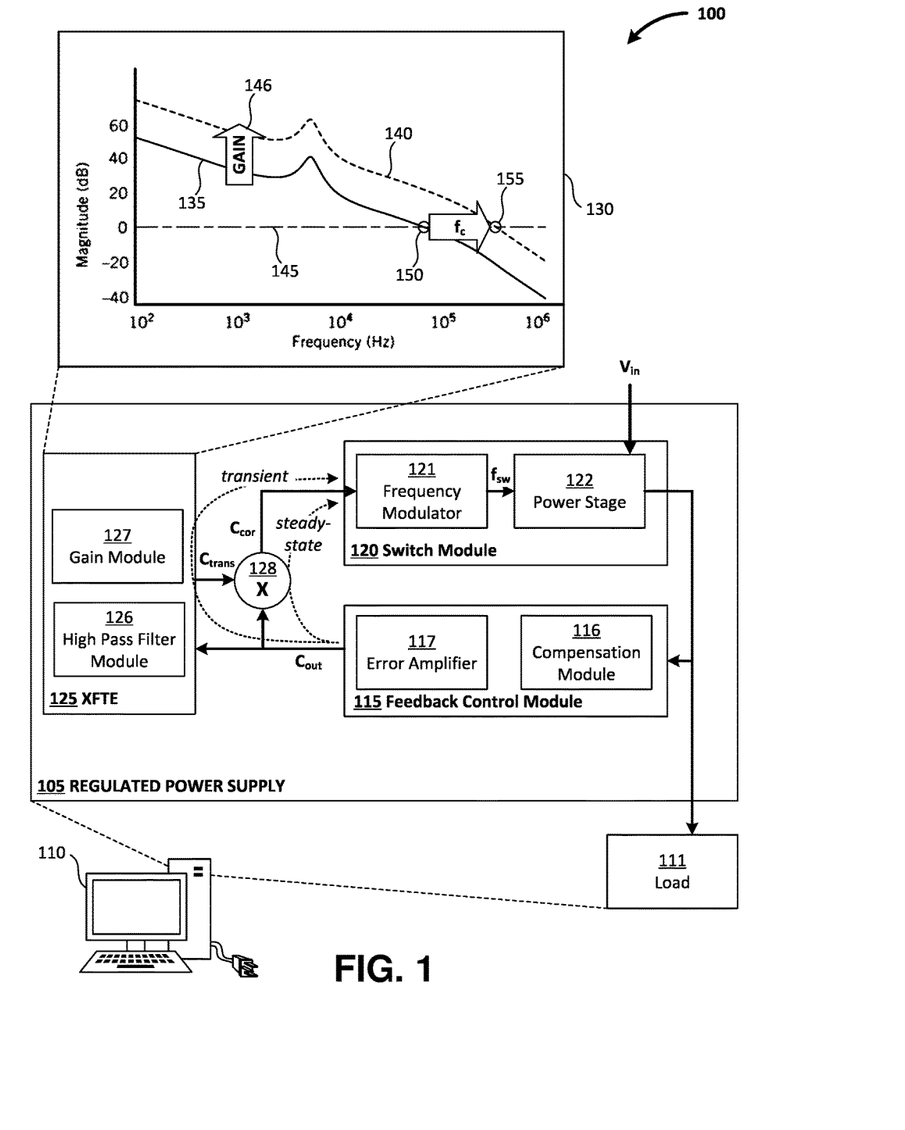
FIG. 1 depicts an exemplary high bandwidth frequency modulation circuit 105 including an exemplary crossover frequency tuning engine (XFTE) 125 employed in an illustrative use-case scenario.

FIG. 1 depicts an exemplary high bandwidth frequency modulation circuit 105 including an exemplary crossover frequency tuning engine 125 employed in an illustrative use-case scenario. In the depicted scenario 100, the variable frequency modulation circuit (e.g., a regulated power supply circuit) 105 is shown in the context of use in a desktop computer 110. The regulated power supply circuit 105 provides power (e.g., regulated voltage and/or regulated alternating current (AC) and/or direct current (DC)) to a load 111. The load 111 may, for example, be one or more processors, graphics cards, other electronic components, or some combination thereof. The regulated power supply circuit 105 includes a feedback control module 115 which monitors a feedback signal corresponding to the output provided to the load 111. The feedback control module 115 contains compensation module 116 and an error amplifier 117. The feedback control module 115 provides an output signal ($C_{out}$) to a switch module 120. The switch module 120 contains a frequency modulator 121 configured to provide a control signal corresponding to a switching frequency ($f_{sw}$) based on a signal $C_{cor}$ corresponding to the signal $C_{out}$ from the feedback control module 115. A power stage 122 of the switch module 120 operates at least one switch according to $f_{sw}$ to transfer power from an input ($V_{in}$) to the load 111.

In the depicted example, a crossover frequency tuning engine (XFTE) 125 is connected between the feedback control module 115 and the switch module 120 by gain stage circuit 128. As depicted, the XFTE 125 receives the input signal $C_{out}$ from the feedback control circuit 128. The XFTE 125 includes a high pass filter module 126 and a gain module 127 and is configured to generate a gain in response to a transient in the switching frequency. The XFTE 125 identifies a transient in the switching frequency and a corresponding correction output signal via the signal $C_{out}$ received from the feedback control module 115. As depicted, during a transient in the switching frequency, the XFTE 125 generates a transient correction signal ($C_{trans}$) corresponding to a non-unity gain. The gain stage circuit 128 applies the contribution of $C_{trans}$ to $C_{out}$ to generate a corrected signal $C_{cor}$. During a steady state switching frequency, $C_{trans}$ corresponds to unity gain and $C_{out}$, accordingly, passes through gain stage circuit 128 to switch module 120 with no contribution from XFTE 125. In various embodiments a transient switching frequency may, by way of example and not limitation, correspond to a step up in demand of load 111 (e.g., calculating bitcoin, processing graphics) or a step down in demand of load 111 (e.g., entering a lower power state, such as a 'sleep mode'). The XFTE 125 selectively contributes correction signal $C_{trans}$ in response to a transient in the switching frequency as detected through the feedback control module 115 based on a predetermined relationship between the switching frequency and the crossover frequency (e.g., a ratio $f_{sw}:f_c$). Accordingly, the XFTE 125 is configured to advantageously maintain the predetermined relationship of $f_{sw}:f_c$ during a transient such as, for example, in load 111. In various embodiments the predetermined relationship may, for example, include a range of ratios between switching frequency and crossover frequency such that the XFTE 125 advantageously maintains an approximate switching frequency to crossover frequency ratio within a predetermined range.

The XFTE 125 generates the signal $C_{trans}$ according to the predetermined relationship of the switching frequency to the crossover frequency. An exemplary Bode plot 130 illustrates an example effect of the XFTE 125 on frequency characteristics of the variable frequency modulation circuit 105. An example unmodified relationship between frequency and magnitude is shown by curve 135 (e.g., obtained by sweeping a network analyzer across a range of frequencies and measuring a response, such as a voltage). The curve 135 crosses 0 dB (indicated by line 145) at the crossover frequency ($f_c$), indicated by point 150. The XFTE 125 responds to a transient in the switching frequency by applying a gain 146 which shifts the curve 135, as shown by shifted curve 140. The crossover frequency is, thus, shifted, as shown by point 155. Accordingly, a bandwidth of the regulated power supply circuit 105 may be advantageously increased by maintaining the predetermined relationship between the crossover frequency and switching frequency and, thereby, maintaining desired stability, noise, and transient response characteristics of the circuit even during transients in the switching frequency.

Figure 2A:
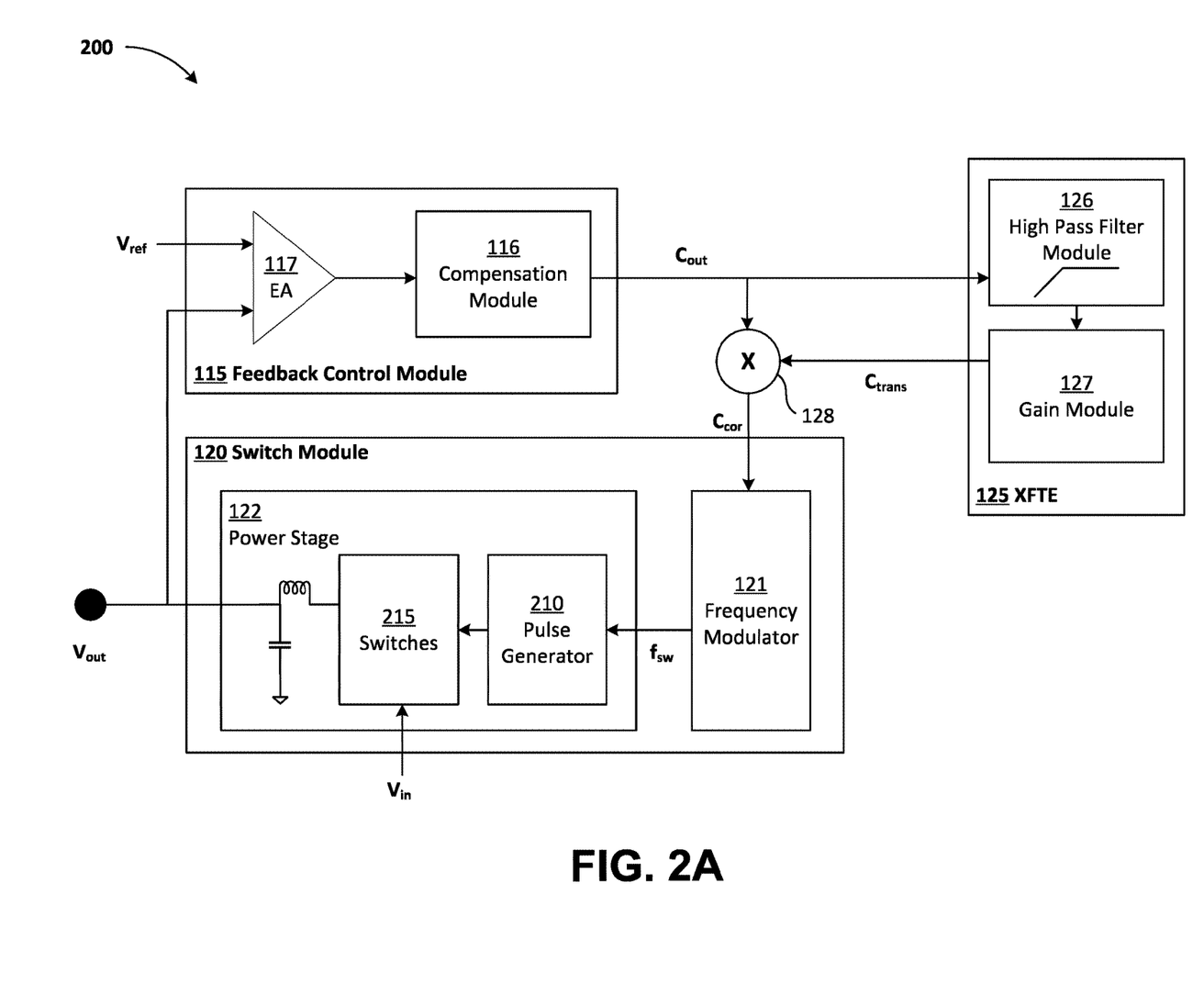
FIG. 2A depicts an exemplary electrical schematic of high bandwidth variable frequency modulation circuit 200 including an exemplary crossover frequency tuning engine 125 configured to maintain a predetermined crossover frequency to switching frequency relationship.

FIG. 2A depicts an exemplary electrical schematic of high bandwidth variable frequency modulation circuit 200 including an exemplary crossover frequency tuning engine 125 configured to maintain a predetermined crossover frequency to switching frequency relationship. In the depicted example, the high bandwidth variable frequency modulation circuit 200 includes a feedback control module 115 configured to monitor a frequency-modulated power output ($V_{out}$) relative to a reference signal ($V_{ref}$) and generate a control output signal ($C_{out}$). An XFTE 125 receives $C_{out}$ and contributes a transient correction signal $C_{trans}$ in response to a transient detected in $C_{out}$ affecting the switching frequency ($f_{sw}$) of a switch module 120 to maintain a predetermined relationship between the switching frequency and crossover frequency of the circuit 200. A gain stage circuit 128 applies $C_{trans}$ as applicable to $C_{out}$ to generate a corrected control signal ($C_{cor}$). The switch module 120 is configured to generate the frequency-modulated power output ($V_{out}$) based on the control signal $C_{cor}$.

In the depicted example, the feedback control module 115 generates an error signal using the error amplifier 117. The error amplifier 117 compares $V_{out}$ to $V_{ref}$ and passes the result to compensation module 116. The compensation module 116 generates a compensation signal based on the error signal. Compensation may include, by way of example and not limitation, filtering, PID control, or some combination thereof. Switch module 120 includes a frequency modulator 121 configure to receive $C_{cor}$ and generate a switching frequency signal to drive the power stage 122 had a corresponding switching frequency ($f_{sw}$). The power stage 122 includes, for example, a pulse generator 210 configured to generate pulses corresponding to $f_{sw}$, and switches 215 configure to frequency modulate a power source ($V_{in}$) according to the $f_{sw}$. The power stage 122 provides the resulting power ($V_{out}$) to a load through an LC filter. In various embodiments base frequency characteristics of the circuit 200, including, by way of example and not limitation, noise, stability, and transient response, may be determined according to predetermined values of the capacitor and inductor in the LC filter.

In the depicted example, the XFTE 125 receives the control output signal $C_{out}$ from the compensation module 116 into a high pass filter module 126. The high pass filter module 126 may, for example, AC couple the XFTE 125 such that the XFTE 125 only contributes to the control signal $C_{cor}$ in response to a transient (higher frequency component) detected in the control output signal $C_{out}$. A gain module 127 generates the transient control signal $C_{trans}$ based on the predetermined relationship between the switching frequency and the crossover frequency of the circuit 200 in response to a transient in $C_{out}$. The gain stage circuit 128 applies $C_{trans}$ to $C_{out}$ to generate $C_{cor}$. Accordingly, the switching frequency control signal output by the frequency modulator 121 is offset by the output of the XFTE 125 in response to a transient. The crossover frequency is thereby shifted, and the predetermined relationship between the crossover frequency and the switching frequency is maintained. Adjustment of the crossover frequency in response to a transient in the switching frequency advantageously allows desired characteristics of the circuit 200 depending on the predetermined relationship between the crossover frequency and the switching frequency such as, for example, noise, transient response, and stability, to be maintained even when the switching frequency shifts in response to a transient in the load, input voltage, other transient affecting the switching frequency, or some combination thereof. Accordingly, the effective bandwidth of the circuit 200 is effectively increased by advantageously maintaining the desired characteristics of the circuit 200 across a wider range of switching frequencies.

Figure 2B:
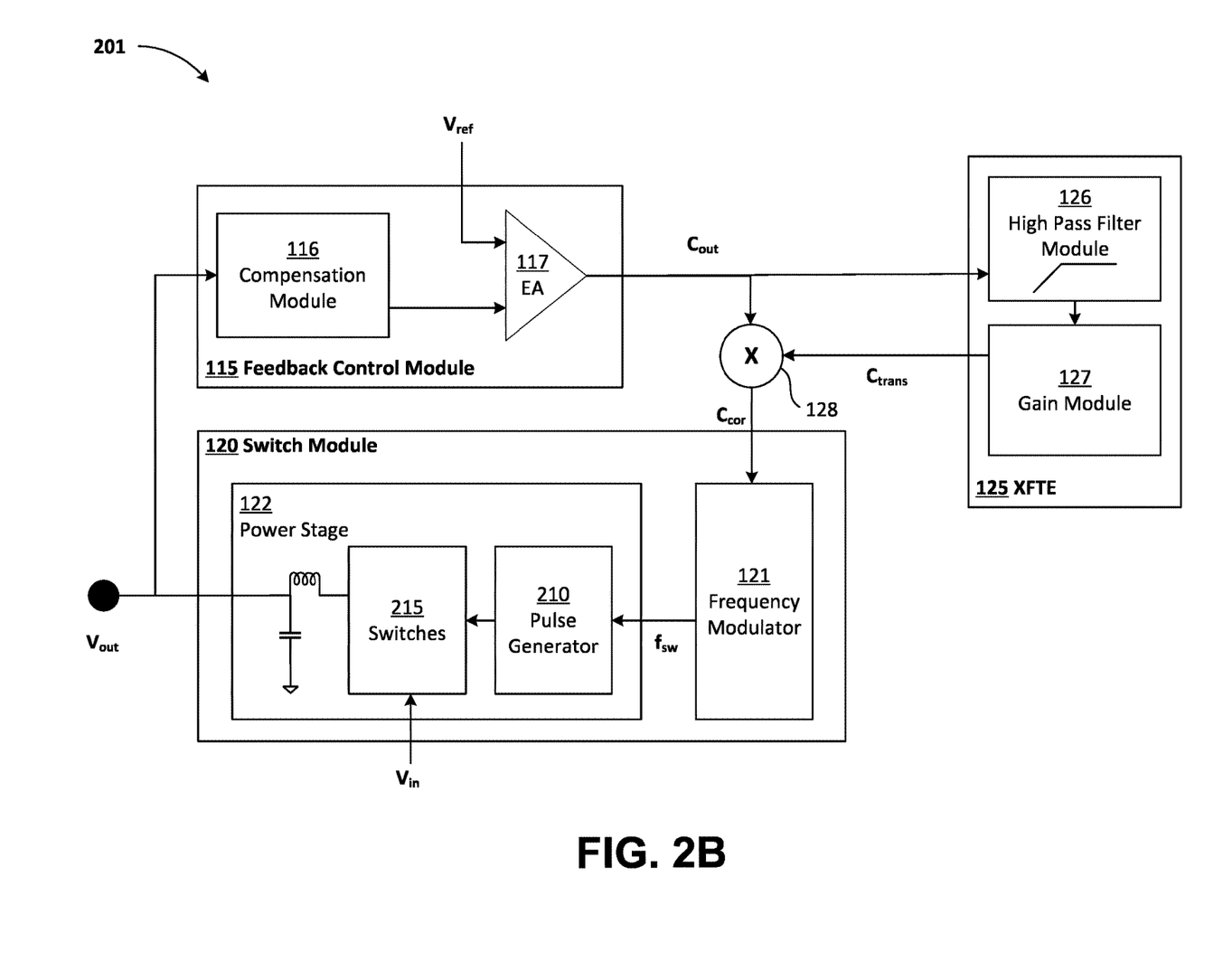
FIG. 2B depicts an exemplary electrical schematic of high bandwidth variable frequency modulation circuit 201 including the exemplary crossover frequency tuning engine 125.

FIG. 2B depicts an exemplary electrical schematic of high bandwidth variable frequency modulation circuit 201 including the exemplary crossover frequency tuning engine 125. The circuit 201 may, for example, be configured as a variation of the circuit 200. The feedback control module 115 includes a compensation module 116 and an error amplifier 117, such as is described in relation to FIG. 2A. In the depicted example, the feedback control module 115 of circuit 201 is configured such that the compensation module 116 receives a signal corresponding to the output ($V_{out}$) and provides a compensated output error amplifier 117. The error amplifier 117 compares the compensated signal to the reference signal ($V_{ref}$) and generates the control output signal ($C_{out}$). The XFTE 125 is configured to contribute a transient control signal to $C_{out}$ via the gain stage circuit 128 in response to a transient detected in $C_{out}$. The switch module 120 is operated in response to the corrected control signal ($C_{cor}$) to generate $V_{out}$ while maintaining the predetermined relationship between the crossover frequency and the switching frequency. Accordingly, the XFTE 125 may effectively and advantageously increase the bandwidth of the circuit 201.

In various embodiments the circuit 200 and the circuit 201 may, for example, be analog circuits, digital circuits, or some combination thereof. The XFTE 125 may, for example, be configured as an analog circuit, a digital circuit, or some combination thereof. In various embodiments the feedback control module 115 the switch module 120, the XFTE 125, or some combination thereof may be provided with an analog to digital converter (ADC), a digital to analog converter (DAC), or some combination thereof.

Figure 3A:
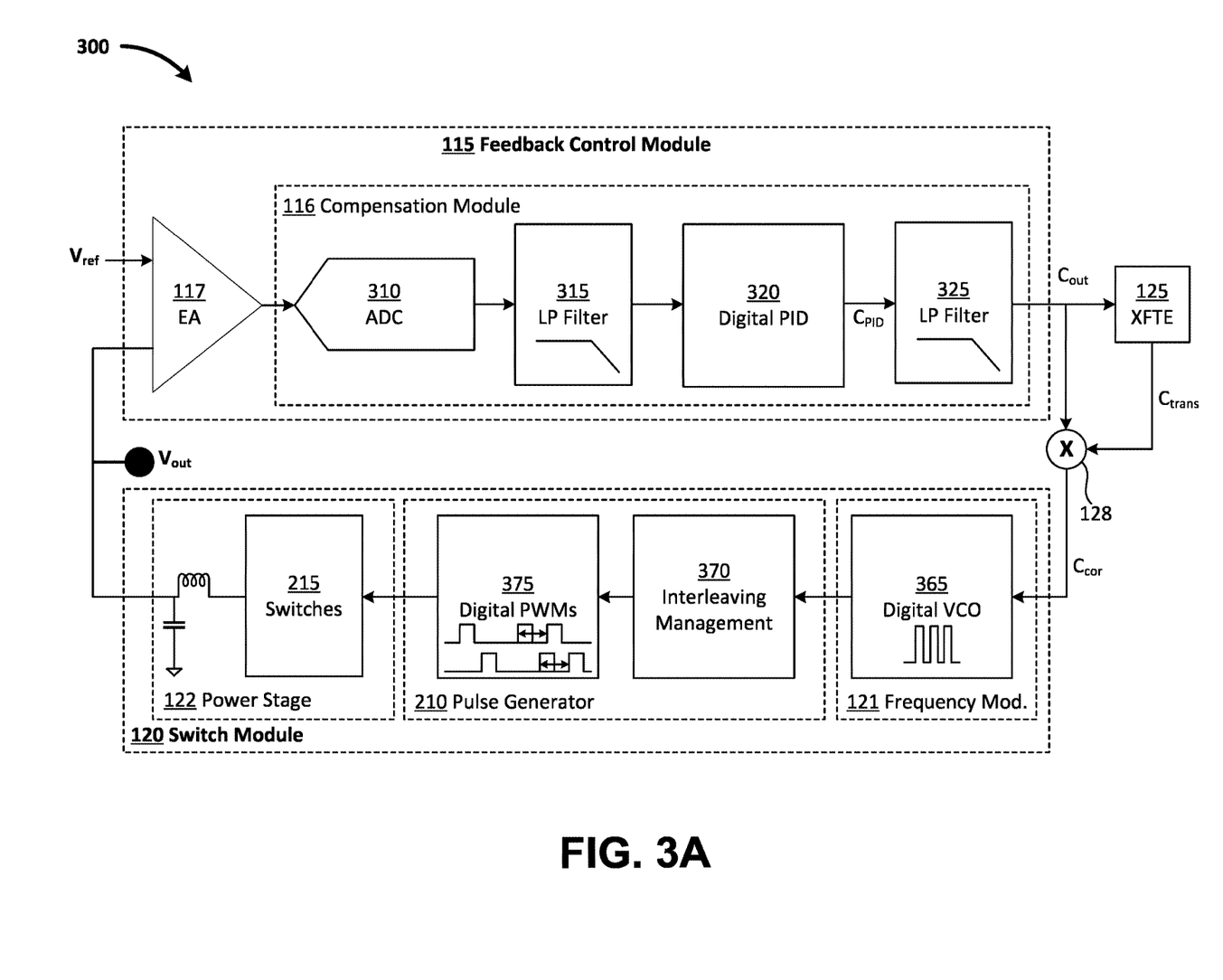
FIG. 3A depicts an exemplary electrical schematic of a high bandwidth constant on time switching regulator circuit 300 including the exemplary crossover frequency tuning engine 125 configured to receive a control signal from a low pass filter 325.
Figure 4:
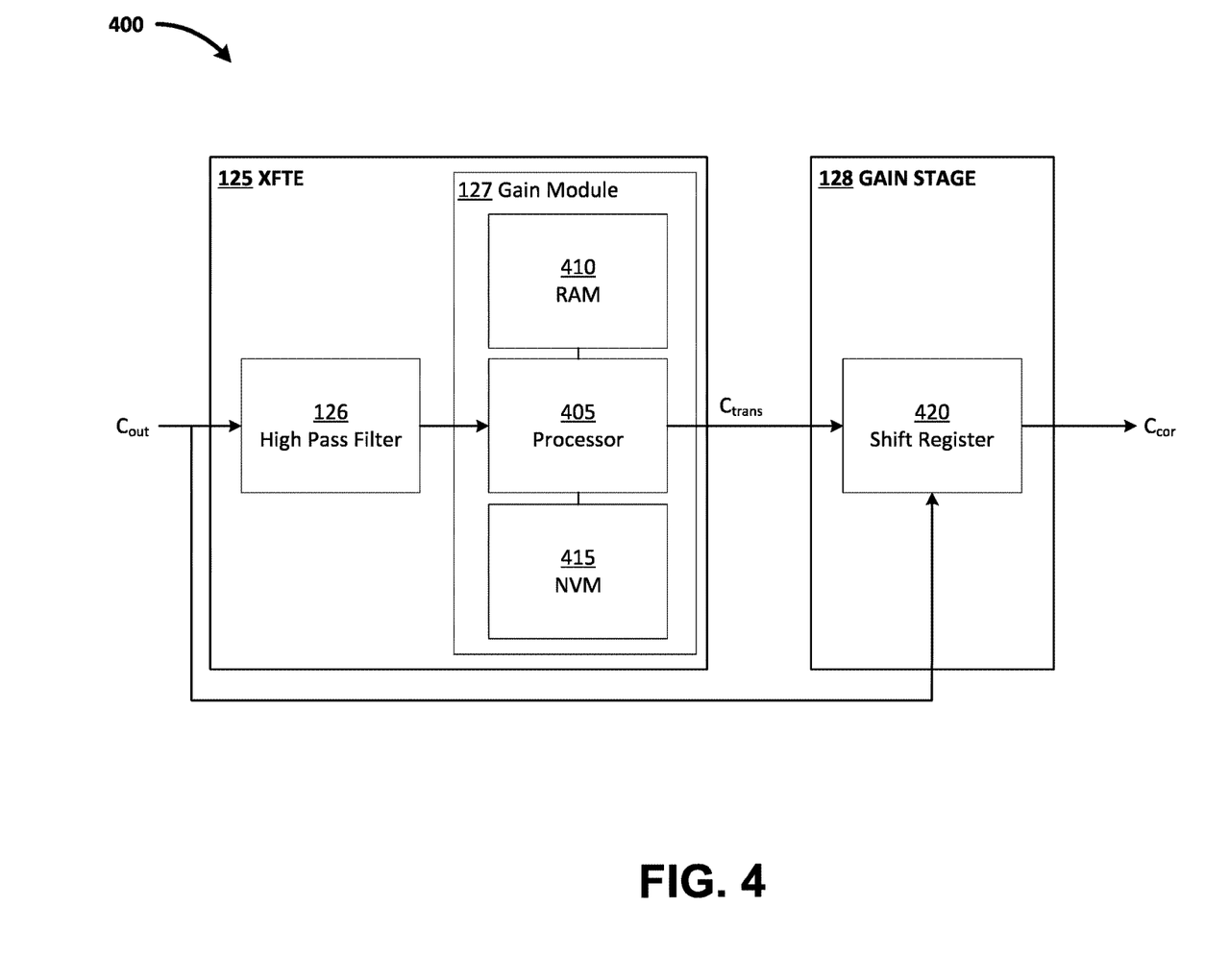
FIG. 4 depicts an exemplary block diagram of the crossover frequency tuning engine 125 configured for a digital variable frequency modulation circuit.

FIG. 3A depicts an exemplary electrical schematic of a high bandwidth constant on time switching regulator circuit 300 including the exemplary crossover frequency tuning engine 125 configured to receive a control signal from a low pass filter 325. In this depicted digital implementation, a feedback control module 115 of the switching regulator circuit 300 includes an analog error amplifier 117. The error amplifier 117 compares an output voltage ($V_{out}$) of the circuit 300 with a reference voltage ($V_{ref}$) and provides a resulting signal to a compensation module 116. The compensation module 116 converts the analog input from the error amplifier 117 into a digital signal by analog to digital converter 310. The output of the analog to digital converter 310 is filtered by a low pass filter 315. The resulting signal is passed to a linear time-insensitive circuit (e.g., proportional, integral; proportional-integral-derivative), embodied in the depicted example as a digital PID (proportional, integral, derivative) circuit 320. The digital PID circuit 320 generates a feedback control signal ($C_{PID}$) which is filtered by a second low pass filter 325. The resulting control output signal ($C_{out}$) is provided to an XFTE 125. The low pass filter 325 may, for example, be configured to filter out the switching frequency of the switch module 120.

The XFTE 125 generates a transient control signal ($C_{trans}$) in response to a transient detected in $C_{out}$ according to a predetermined relationship between a switching frequency and crossover frequency of the circuit 300. A gain stage circuit 128 (e.g., a multiplier, a shift register, other appropriate gain stage components, or some combination thereof) applies the contribution of $C_{trans}$ to $C_{out}$ to generate a corrected control signal ($C_{cor}$). A frequency modulator 121 of the switch module 120 includes a digital voltage-controlled oscillator (VCO) 365. The digital VCO 365 generates a frequency control signal according to $C_{cor}$. A pulse generator 210 receives the frequency control signal and operates a plurality of switches 215 in a power stage 122 at a frequency represented by the frequency control signal. In the depicted example, the pulse generator 210 includes interleaving management module 370 and digital pulse width modulators (PWMs) 375, which sequentially operate the switches 215 at the switching frequency in response to the frequency control signal to generate the determined $V_{out}$. Accordingly, the constant on time switching regulator circuit 300 may be advantageously operated across a wider bandwidth of switching frequencies by selective contribution of the XFTE 125 during a transient in the switching frequency to maintain a predetermined relationship between the crossover frequency and the switching frequency of the circuit 300.

Figure 3B:
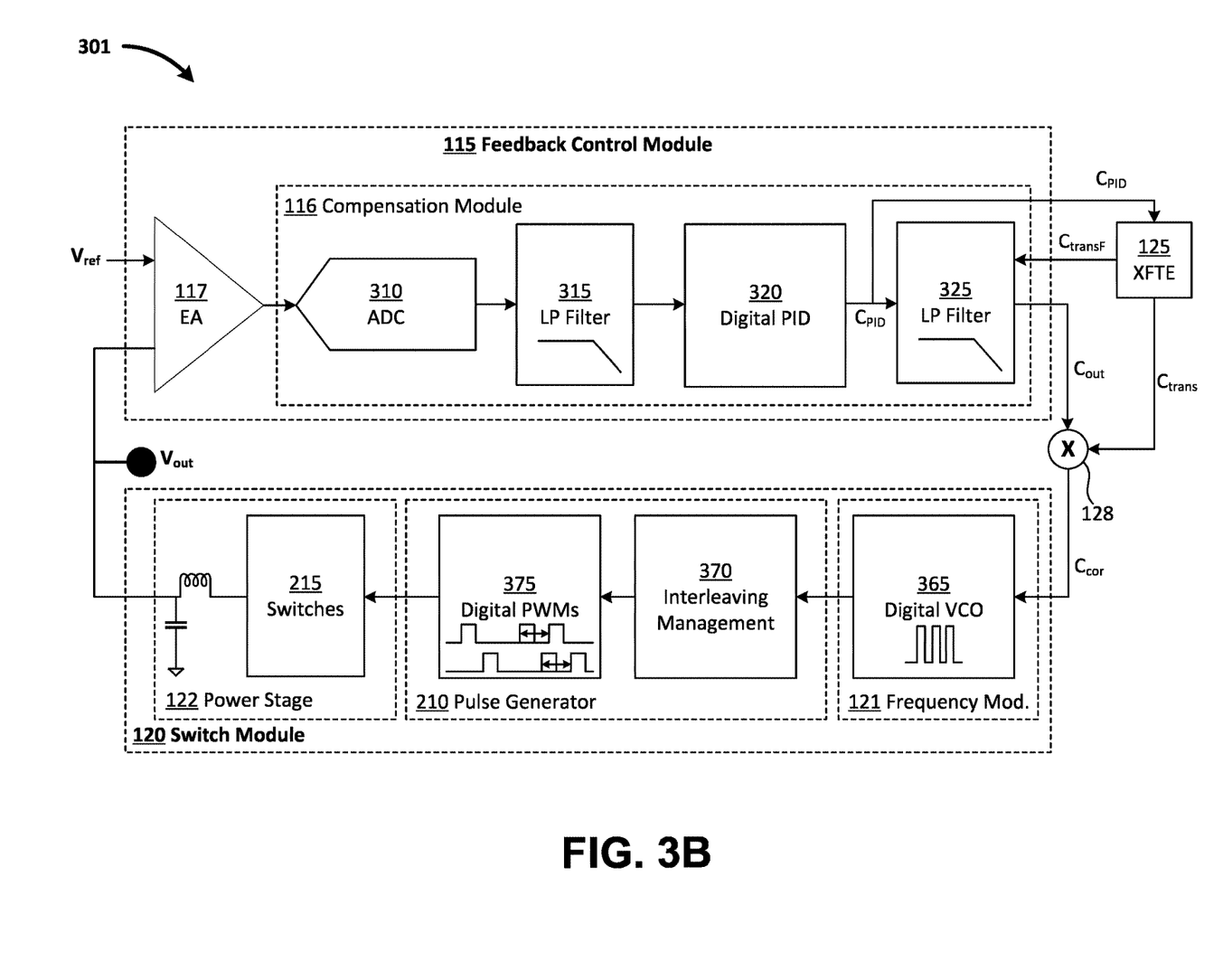
FIG. 3B depicts an exemplary electrical schematic of a high bandwidth constant on time switching regulator circuit 301 including the exemplary crossover frequency tuning engine 125 configured to receive a control signal from a PID circuit 320 and to dynamically contribute control input to an LP filter 325.

FIG. 3B depicts an exemplary electrical schematic of a high bandwidth constant on time switching regulator circuit 301 including the exemplary crossover frequency tuning engine 125 configured to receive a control signal from a PID circuit 320 and to dynamically contribute control input to an LP filter 325. The error amplifier 117 compares an output voltage ($V_{out}$) of the circuit 300 with a reference voltage ($V_{ref}$) and provides a resulting signal to a compensation module 116. The compensation module 116 converts the analog input from the error amplifier 117 into a digital signal by analog to digital converter 310. The output of the analog to digital converter 310 is filtered by a low pass filter 315. The resulting signal is passed to a digital PID (proportional-integral-derivative) circuit 320. The digital PID circuit 320 generates a feedback control signal ($C_{PID}$), which is received as an input by the XFTE 125.

The XFTE 125 selectively generates transient control signal $C_{trans}$ and a transient filter control signal $C_{transF}$ in response to a transient in the switching frequency detected in the PID control output signal $C_{PID}$ according to a predetermined relationship between the crossover frequency and the switching frequency for the circuit 301. In various embodiments $C_{trans}$ and $C_{transF}$ may be separate signals or the same signal. The low pass filter 325 is configured to dynamically adjust at least one cutoff frequency in response to $C_{transF}$. For example, the low-pass filter 325 and XFTE 125 may be configured such that a frequency range of the low-pass filter 325 increases when the switching frequency increases and decreases when the switching frequency decreases. The low pass filter 325 may, by way of example and not limitation, adjust a cutoff frequency to continue to filter out the switching frequency in response to a transient in the switching frequency. In various embodiments the low pass filter 325 may, by way of example and not limitation, be adjusted to mitigate effects of equivalent series resistance (ESR) of an output capacitor bank. Accordingly, the XFTE 125 may advantageously dynamically control the bandwidth of the circuit 301 in response to a transient in switching frequency. The dynamically controlled bandwidth may advantageously increase an effective bandwidth of the circuit 301 while maintaining desired design characteristics of the circuit 301.

The output $C_{PID}$ of the digital PID 320 is filtered by the (dynamic) lowpass filter 325 to generate a filtered control output signal ($C_{out}$). The transient control signal $C_{trans}$ generated by the XFTE 125 is applied to the filtered control output signal $C_{out}$ by the gain stage circuit 128 to generate a corrected control signal ($C_{cor}$). Accordingly, the XFTE 125 selectively modifies the filtered control output signal provided to the digital VCO 365 to advantageously maintain the predetermined switching frequency to crossover frequency relationship of the circuit 301 during a transient in the switching frequency as detected in an output of the digital PID 320.

FIG. 4 depicts an exemplary block diagram of the crossover frequency tuning engine 125 configured for a digital variable frequency modulation circuit. In the depicted digital circuit 400, the crossover frequency tuning engine (XFTE) 125 receives a control output signal ($C_{out}$) such as, for example, is described in relation to FIGS. 2A-3B. The $C_{out}$ signal may, for example, be a digital word. The XFTE 125 applies a high pass filter module 126 to $C_{out}$. The filtered control output signal is processed by a processor 405 of a gain module 127. The processor is operably connected to a memory module 410 and a storage module 415. As depicted, the memory module 410 is random access memory (RAM) and the storage module 415 is nonvolatile memory (NVM). The processor 405, for example, may be operably connected and configured to execute a program of instructions retrieved from the storage module 415 and loaded in the memory module 410. The program of instructions may, for example, be a software program including, by way of example and not limitation, firmware. The gain module 127 may include one or more components including, by way of example and not limitation, ASICs (application-specific integrated circuits), FPGAs (field-programmable gate arrays), DSPs (digital signal processors), microcontrollers, or some combination thereof.

The gain module 127 generates a transient control signal ($C_{trans}$), in response to a transient in $C_{out}$, according to a predetermined relationship between switching frequency and crossover frequency of a corresponding circuit. The $C_{trans}$ signal may, for example, represent a shift to be applied to a digital word by a shift register. A gain stage circuit 128 includes a shift register 420 configured to apply the $C_{trans}$ signal to the $C_{out}$ signal by shifting the $C_{out}$ word according to the $C_{trans}$ offset. Accordingly, the gain stage circuit 128 generates a corrected control signal ($C_{cor}$). The $C_{cor}$ signal made, for example, be a digital word shifted in response to a transient in the $C_{out}$ input received by the XFTE 125. In various embodiments the digital control signal correction circuit 400 may be provided with one or more ADCs, DACs, or some combination thereof. The circuit 400 may advantageously increase an effective bandwidth of a digital and/or analog variable frequency modulation circuit by modifying a digital control output signal in response to a transient to maintain a predetermined crossover frequency to switching frequency relationship, and so maintain desired circuit characteristics such as, by way of example and not limitation, noise, stability, and transient response.

Figure 5:
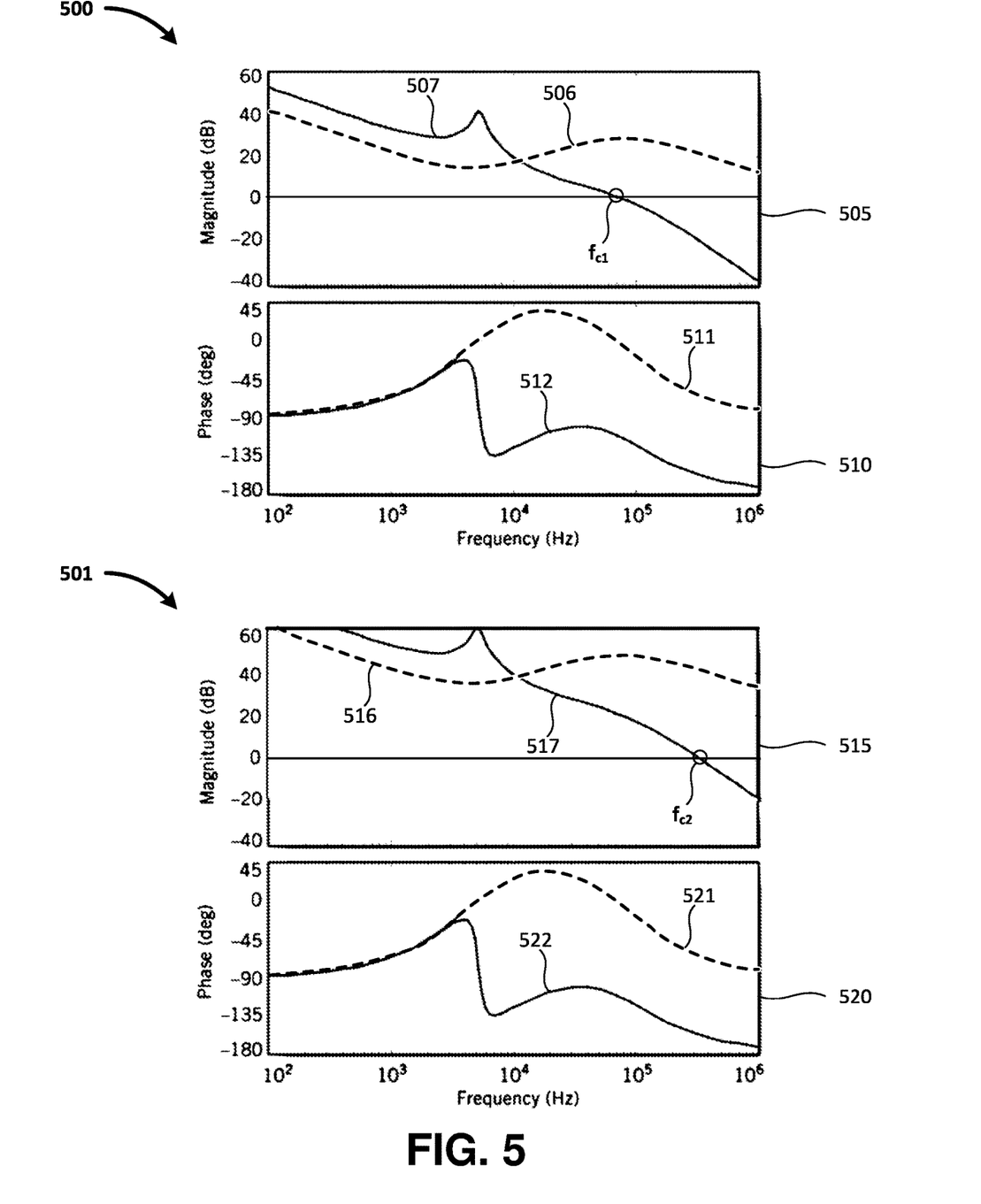
FIG. 5 depicts exemplary results of operating of the crossover frequency tuning engine 125 in the exemplary switching regulator circuit 300 of FIG. 3A.

FIG. 5 depicts exemplary results of operating of the crossover frequency tuning engine 125 in the exemplary switching regulator circuit 300 of FIG. 3A. Frequency response (e.g., Bode plots) of an exemplary circuit are depicted. The exemplary circuit may be, for example, a circuit such as is described in relation to FIG. 3A. The first set of frequency response plots 500 correspond to an exemplary steady state value of the circuit. A magnitude plot 505 illustrates the magnitude of the frequency response corresponding to a range of frequencies, and phase plot 510 illustrates a phase of the frequency response at corresponding frequencies. The solid lines 507 and 512 depict frequency response of the entire circuit. The dashed lines 506 and 511 illustrate frequency response of a feedback control circuit such as, for example feedback control module 115 of FIG. 3A. The peak in the line 507 corresponds, for example, to a resonant frequency of the inductor and capacitor of the power stage 122 depicted in FIG. 3A. A crossover frequency at steady state of the circuit is shown where the frequency response line 507 of the circuit crosses unity gain (0 dB), indicated on the magnitude plot 505 as $f_{c1}$.

The second set of frequency response plots 501 correspond to an exemplary crossover frequency tuned circuit such as shown in FIG. 3A during a transient (e.g., in signal $C_{out}$) in which the XFTE 125 contributes a transient control signal (e.g., $C_{trans}$) a control signal provided to a switch module 120. A magnitude plot 515 illustrates the magnitude of the frequency response corresponding to a range of frequencies, and a phase plot 520 illustrates a phase of frequency response at corresponding frequencies. Solid lines 517 and 522 depict frequency response of the entire circuit. The dashed lines 516 and 521 illustrate frequency response of the feedback control circuit.

In the depicted example, the XFTE 125 has contributed a transient control signal corresponding to a gain of approximately 20 decibels. Accordingly, the magnitude curves of the solid lines 517 and the magnitude curves of the dashed lines 516 of plot 515 are shifted upwards relative to the steady state curves shown in plot 505. Thus, the crossover frequency of the circuit has been shifted higher, as indicated in magnitude plot 515 by $f_{c2}$. For example, the transient response plots 501 may correspond to an increased switching frequency. The XFTE 125 may generate a transient control signal corresponding to a gain configured to adjust the crossover frequency such that a predetermined relationship between the crossover frequency in the switching frequency of the circuit is maintained. Accordingly, bandwidth of the circuit is dynamically increased according to the change in switching frequency such that, for example, desired characteristics of the circuit (e.g., noise, transient response, and stability) are maintained.

Figure 6:
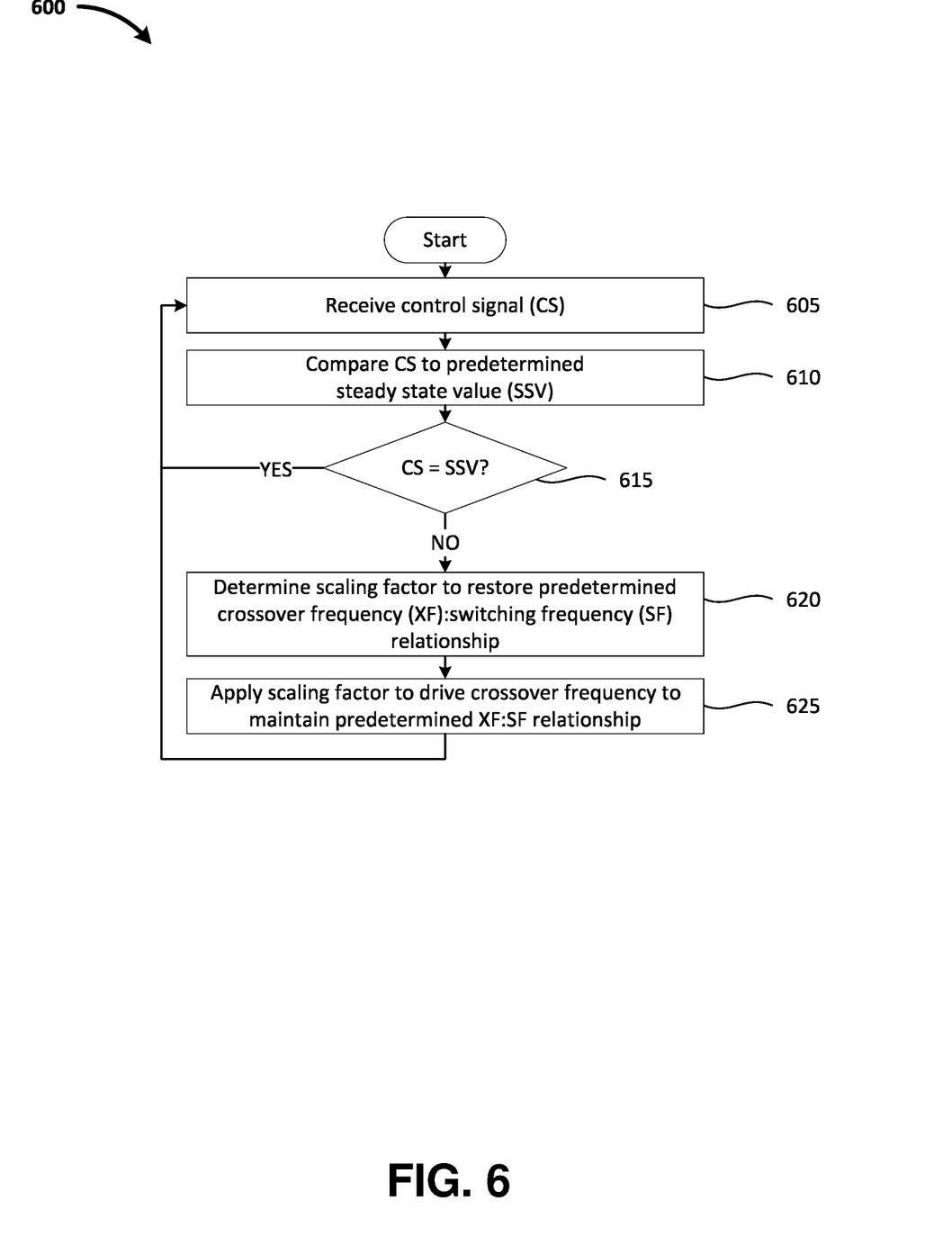
FIG. 6 depicts an exemplary method for tuning crossover frequency in a variable frequency modulation circuit with a crossover frequency tuning engine.

FIG. 6 depicts an exemplary method for tuning crossover frequency in a variable frequency modulation circuit with a crossover frequency tuning engine. In the depicted method 600, a control signal is received 605 (e.g., $C_{out}$). The control signal is compared 610 to a predetermined steady state value of the control signal. If the control signal is equal to the steady state value 615, then no crossover frequency tuning is needed, and the method returns to step 605. If the control signal is not equal to the steady state value 615, then a scaling factor is determined 620 to restore a predetermined crossover frequency to switching frequency relationship. The scaling factor is applied 625 to modify the crossover frequency of the circuit to maintain the predetermined crossover frequency to switching frequency relationship (e.g., by applying a transient control signal to a control output signal to generate a corrected control signal). The method 600 repeats in a substantially continuous process. Accordingly, a predetermined relationship between a crossover frequency in a switching frequency of a circuit may be advantageously maintained by application of the scaling factor (e.g., a gain) to one or more control signals of a variable frequency modulation circuit.

In various embodiments the steady state value, the predetermined relationship, or some combination thereof may be embodied in analog circuit components (e.g., values of resistors, inductors, capacitors, transistors, amplifiers), stored in memory modules (e.g., lookup table, NVM, RAM), or some combination thereof. Various embodiments of the method 600 may, by way of example and not limitation, be implemented as an analog circuit, a digital circuit, or some combination thereof. In various embodiments circuits configured to implement the method 600 may include, for example, circuits such as described in relation to FIGS. 1-4.

Figure 7:
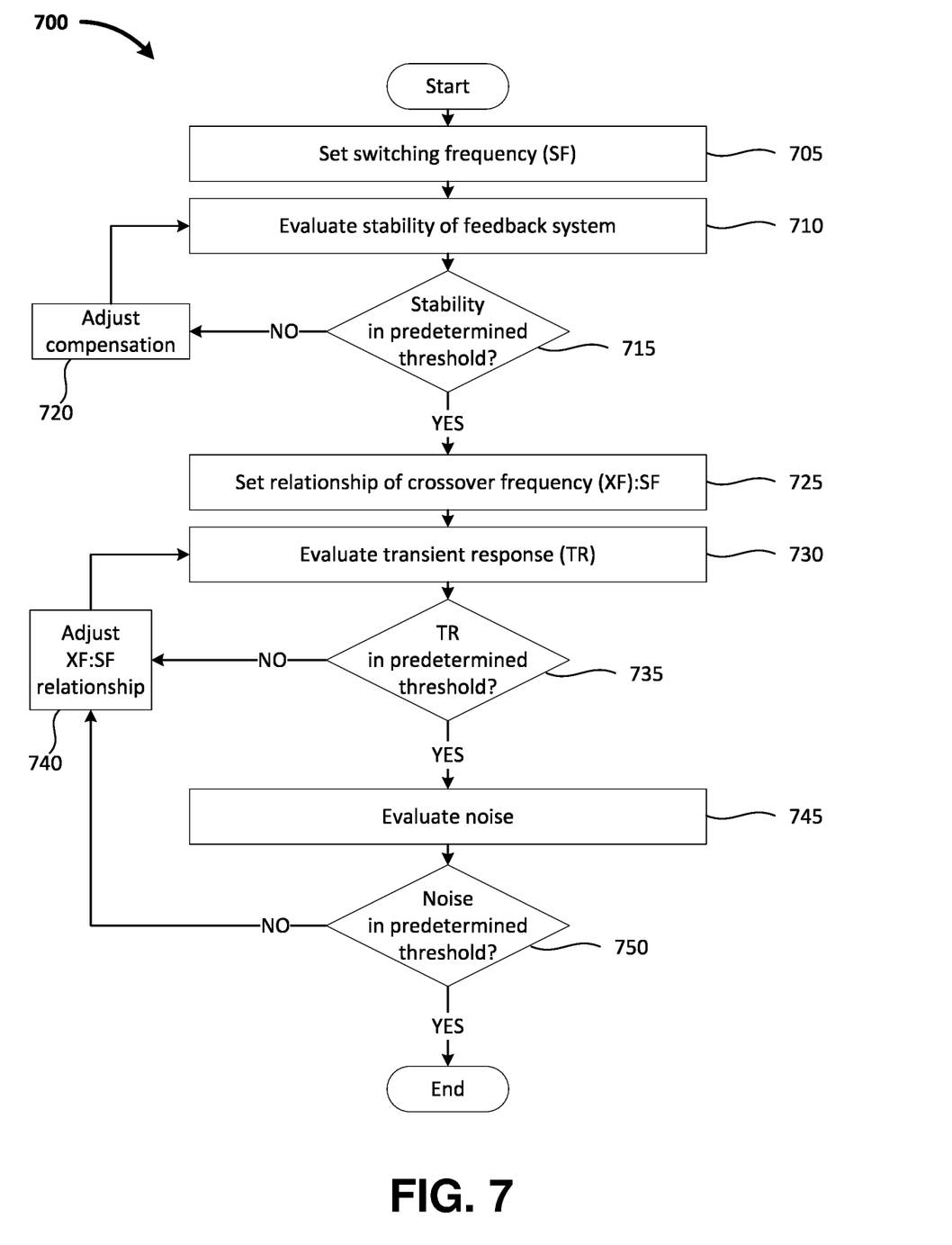
FIG. 7 depicts an exemplary method for determining a predetermined crossover frequency to switching frequency relationship in a crossover frequency tuning engine.

FIG. 7 depicts an exemplary method for determining a predetermined crossover frequency to switching frequency relationship in a crossover frequency tuning engine. In the depicted method 700, switching frequency 705 of a variable frequency modulation circuit (e.g., as described in relation to FIGS. 1-4) is set. The switching frequency may, by way of example and not limitation, be predetermined and/or dynamically determined within a predetermined range. The stability of a feedback system (e.g., feedback control module 115) of the circuit is then evaluated 710. The stability may be evaluated, for example, by characterizing the circuit using a network analyzer to sweep across a range of frequencies to determine magnitude of stimulus versus response and/or phase ratio between stimulus and response (e.g., as described in relation to FIG. 5). If the stability does not meet a predetermined threshold 715, then compensation (e.g., PID control coefficients, capacitor and/or resistor values, filter values) is adjusted 720 and the stability of the feedback system is reevaluated 710.

Once the stability of the feedback system meets a predetermined threshold 715, then a relationship (e.g., ratio) of crossover frequency to switching frequency of the circuit is set 725. A transient response of the circuit is evaluated 730. For example, transient response may be measured by plotting a signal of interest (e.g., Vout, Cout, fsw, Ccor, Ctrans, or some combination thereof) in time while inducing a transient (e.g., in an input power Vin, load on Vout, or some combination thereof). If a transient response is not within a predetermined threshold 735, then the relationship is adjusted 740 and the transient less response is reevaluated 730. Once the transient response is within the predetermined threshold 735 (e.g., if a signal of interest recovers to a stable value within a predetermined time), then the noise of the circuit is evaluated 745. If the noise exceeds a predetermined threshold 750, then the relationship is adjusted 740, and step 730 through 750 are repeated. Once the noise is within a predetermined threshold 750, then the relationship is determined and the method 700 is complete. The relationship may be saved, for example, in a data store, may be implemented in circuit components, or some combination thereof. The method 700 may, by way of example and not limitation, be performed on a simulated circuit, on a test circuit, on an actual circuit, or some combination thereof. Accordingly, a predetermined relationship may be set between crossover frequency and a switching frequency of a circuit to achieve desired characteristics of stability, noise, and transient response. A predetermined relationship may, for example, be implemented in an XFTE 125 such that the XFTE 125 is configured to advantageously generate a transient control signal to maintain the predetermined relationship in response to a transient in the switching frequency of the circuit.

Although various embodiments have been described with reference to the figures, other embodiments are possible. For example, although an exemplary system in a scenario 100 has been described with reference to FIG. 1, other implementations may be deployed in other industrial, scientific, medical, commercial, and/or residential applications. In various embodiments, various components and/or subcircuits may, by way of example and not limitation, be implemented as analog circuits, digital circuits, or some combination thereof. For example, a filter (e.g., low pass filter 325) circuit may be implemented as a digital and/or analog circuit. The low pass filter 325 may, by way of example and not limitation, be implemented as at least one resistor(s) with adjustable resistance values (e.g., by a transistor(s)) and an active gain component(s) (e.g., an operational amplifier), a digital filter (e.g., microprocessor, ASIC, FPGA, digital signal processor), or some combination thereof. In various embodiments, circuits may include, for example, finite impulse response (FIR) filter circuits and/or infinite impulse response (IIR) filter circuits.

In various embodiments a variable frequency modulation circuit with an XFTE may be implemented in various use-case scenarios. An XFTE-equipped variable frequency modulation circuit may, for example, be implemented as a power regulator. The variable frequency modulation circuit may, by way of example and not limitation, be implemented as a constant on-time regulator, a constant off-time regulator, a constant duty-cycle regulator, or some combination thereof.

In various embodiments an XFTE (e.g., 125) may be configured such that the crossover frequency is constrained below ½ of the switching frequency (for example, below the Nyquist frequency). in various embodiments the crossover frequency may be constrained between, by way of example and not limitation, ⅓ and ⅛ of the switching frequency. In various embodiments the XFTE may be configured to maintain a predetermined crossover frequency to switching frequency relationship of a circuit by generating a gain (e.g., by gain module 127) using a lookup table, a predetermined algorithm, an analog circuit with predetermined and or variable component values, or some combination thereof.

In various embodiments a feedback control module (e.g., 115) may include a quantum charge modulator (QCM). The QCM may, by way of example and not limitation, be configured such as is described in U.S. patent Ser. No. 10/523,102, filed by Babazadeh, et al. on Jan. 10, 2019 and issued Dec. 31, 2019, the entire contents of which are incorporated herein by reference. For example, a QCM may be configured to modulate the frequency of a switch signal to achieve a fast transient response while holding the average frequency constant over a predetermined number of N cycles. In an illustrative example, a QCM may include a compensation processor configured to compensate an error signal and generate a compensation signal by performing operations to maintain an average switching frequency over the N cycles in response to the transient. The compensation signal may be a function of a real phase deviation $\Delta T_{SW}$ between a stable pulse modulated signal having a cycle period $T_{SW}$ before the transient and a measured pulse modulated signal having a cycle period $T_{SW\_M}$ after the transient. A forgetting factor may be used to calculate the phase deviations. The QCM may provide a compensation free, stable, and high-performance response over power stage component changes.

In various embodiments, the QCM may, by way of example and not limitation, be configured to modulate the compensation signal output from a conventional linear time-invariable (LTI) (e.g., a proportional and integrator (PI), a proportional-integral-derivative (PID)) compensator module (e.g., a digital and/or analog PID, such as digital PID of), for example, as a function of a difference between a measured period after the transient and a period during steady-state operation prior to the transient. By selectively applying a forgetting factor in certain predetermined operating conditions, the average frequency may be held constant over the predetermined N cycles of the power converter. Accordingly, various embodiments including a QCM and XFTE (e.g., 125) may advantageously dynamically control bandwidth to provide a significantly increased effective bandwidth of a variable frequency modulation circuit.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be in a desktop environment, has been described with reference to the above figures, other implementations may be deployed in other processing applications, such as portable and/or networked environments.

Temporary auxiliary energy inputs may be received, for example, from chargeable or single use batteries, which may enable use in portable or remote applications. Some embodiments may operate with other DC voltage sources, such as 1.5V, 3V, 6V, 9V, and/or 12V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:
1. A variable frequency modulation circuit comprising:
a feedback control circuit configured to generate a control output signal from both a predetermined reference and a control input signal, wherein the control input signal corresponds to a pulse-width modulated output delivered to a load through an inductor;
a frequency modulation circuit configured to generate, in response to a frequency control input signal, a frequency control output signal corresponding to a switching frequency of at least one switch circuit, wherein the switch circuit is configured to generate the pulse-width modulated output; and,
a crossover frequency tuning engine (XFTE) configured such that, in a first mode corresponding to a steady state, the XFTE is quiescent and, in response to a transient in the frequency control output signal, the XFTE operates in a second mode such that the XFTE generates a transient control signal to cause a predetermined relationship be maintained between a switching frequency and a crossover frequency,
wherein the crossover frequency corresponds to a frequency of a closed-loop circuit at unity gain, the closed-loop circuit including at least the feedback control circuit and the frequency modulation circuit.
2. The circuit of claim 1, wherein:
the XFTE comprises a high-pass filter and a gain generation circuit, and
the XFTE is configured to generate from the control output signal of the frequency modulation circuit the transient control signal in response to the transient in the frequency control output signal.

3. The circuit of claim 1, further comprising a gain stage circuit configured to apply the transient control signal to the control output signal to generate the frequency control input signal.

4. The circuit of claim 3, wherein the gain stage circuit comprises a multiplication circuit.

5. The circuit of claim 3, wherein the gain stage circuit comprises a shift register.

6. The circuit of claim 1, wherein the feedback control circuit comprises a compensation circuit and a filter circuit operatively connected to apply a transfer function with at least one cutoff frequency to an output of the compensation circuit and operatively connected to the XFTE such that the at least one cutoff frequency of the filter circuit changes in response to the transient to maintain a predetermined relationship between the at least one cutoff frequency and the switching frequency.

7. The circuit of claim 1, wherein the predetermined relationship constrains the crossover frequency at least between one-eighth and one-third of the switching frequency.

8. The circuit of claim 1, wherein the variable frequency modulation circuit is a switching regulator.

9. The circuit of claim 8, wherein the variable frequency modulation circuit is configured as at least one of: a constant on-time regulator, a constant off-time regulator, and a constant duty-cycle regulator.

10. The circuit of claim 1, wherein the feedback control circuit comprises a quantum charge modulator.

11. The circuit of claim 1, wherein the feedback control circuit comprises an error amplifier and a compensation network circuit.

12. The circuit of claim 11, wherein the XFTE receives the control output signal as an output of the error amplifier.

13. The circuit of claim 11, wherein the XFTE receives the control output signal as an output of the compensation network circuit.

14. The circuit of claim 13, wherein the compensation network circuit comprises a PID circuit and the XFTE receives the control output signal as an output of the PID circuit.

15. The circuit of claim 1, wherein the frequency modulation circuit comprises a voltage-controlled oscillator configured to generate the frequency control output signal based on the frequency control input signal.

16. The circuit of claim 1, wherein the switch circuit is interleaved.

17. The circuit of claim 3, wherein the gain stage generation circuit comprises both a memory module containing a program of instructions and a processor operatively connected to the memory module, such that when the processor executes the program of instructions, the gain generation circuit generates the transient control signal based on the predetermined relationship between the switching frequency and the crossover frequency.

18. A system comprising:
a load circuit; and,
a regulated power supply circuit configured to receive power from a power source and provide power to the load, the regulated power supply circuit comprising:
  a feedback control circuit configured to generate a control output signal from both a predetermined reference and a control input signal, wherein the control input signal corresponds to a pulse-width modulated output delivered to the load circuit;
  a frequency modulation circuit configured to generate, in response to a frequency control input signal, a frequency control output signal corresponding to a switching frequency of at least one switch circuit, wherein the switch circuit is configured to generate the pulse-width modulated output; and,
  a crossover frequency tuning engine (XFTE) configured such that, in a first mode corresponding to a steady state, the XFTE is quiescent and, in response to a transient in the frequency control output signal, the XFTE operates in a second mode such that the XFTE generates a transient control signal to cause a predetermined relationship be maintained between a switching frequency and a crossover frequency, wherein the crossover frequency corresponds to a frequency of a closed-loop circuit at unity gain, the closed-loop circuit including at least the feedback control circuit and the frequency modulation circuit.

19. The system of claim 18, wherein the regulated power supply circuit further comprises the at least one switch circuit configured to generate the pulse-width modulated output to frequency modulate the received power at the switching frequency.

20. The system of claim 18, wherein the load circuit comprises at least one processor.

21. The system of claim 18, wherein the load circuit comprises a memory module.

22. The system of claim 18, wherein the load circuit comprises a graphic card.

23. The system of claim 18, wherein the load circuit comprises a computer system.

24. The system of claim 18, wherein the load circuit comprises a crypto transaction system.

25. The system of claim 18, further comprising a display device.

26. The system of claim 18, comprising an application-specific integrated circuit.

27. The system of claim 18, comprising a field-programmable gate array.

28. The system of claim 18, wherein at least the XFTE is implemented as an integrated circuit.

29. The system of claim 18, further comprising analog circuit components.

30. The system of claim 18, further comprising digital circuit components.

* * * * *